May 22, 1928.                     1,671,005
W. C. BARNES
WATER WHEEL
Filed Sept. 3, 1927    3 Sheets-Sheet 2
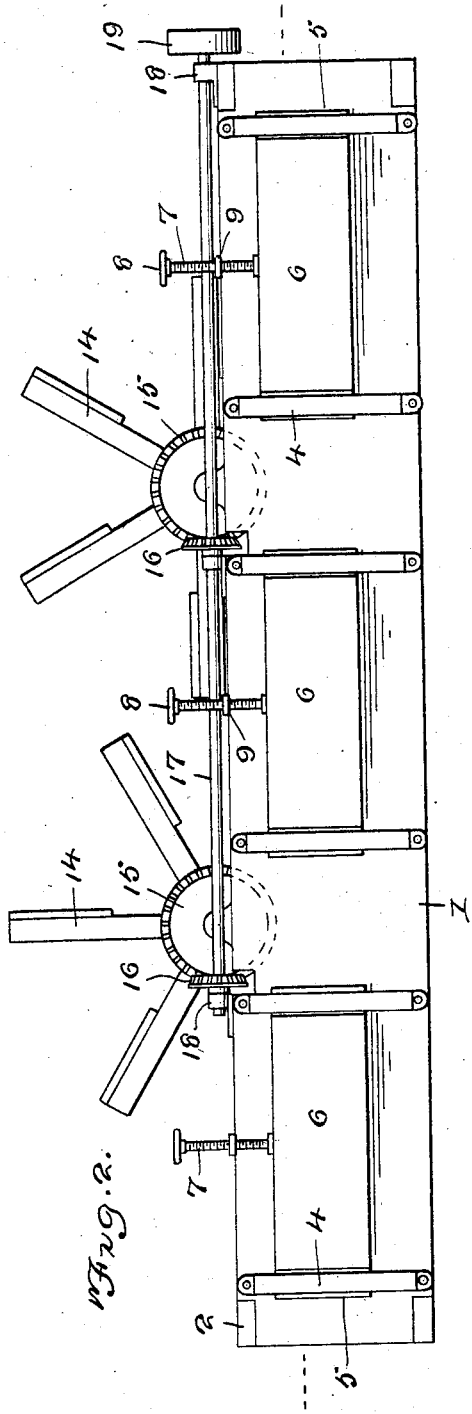
W. C. Barnes
INVENTOR
BY Victor J. Evans
ATTORNEY May 22, 1928.
W. C. BARNES
WATER WHEEL
Filed Sept. 3, 1927
1,671,005
3 Sheets-Sheet 3
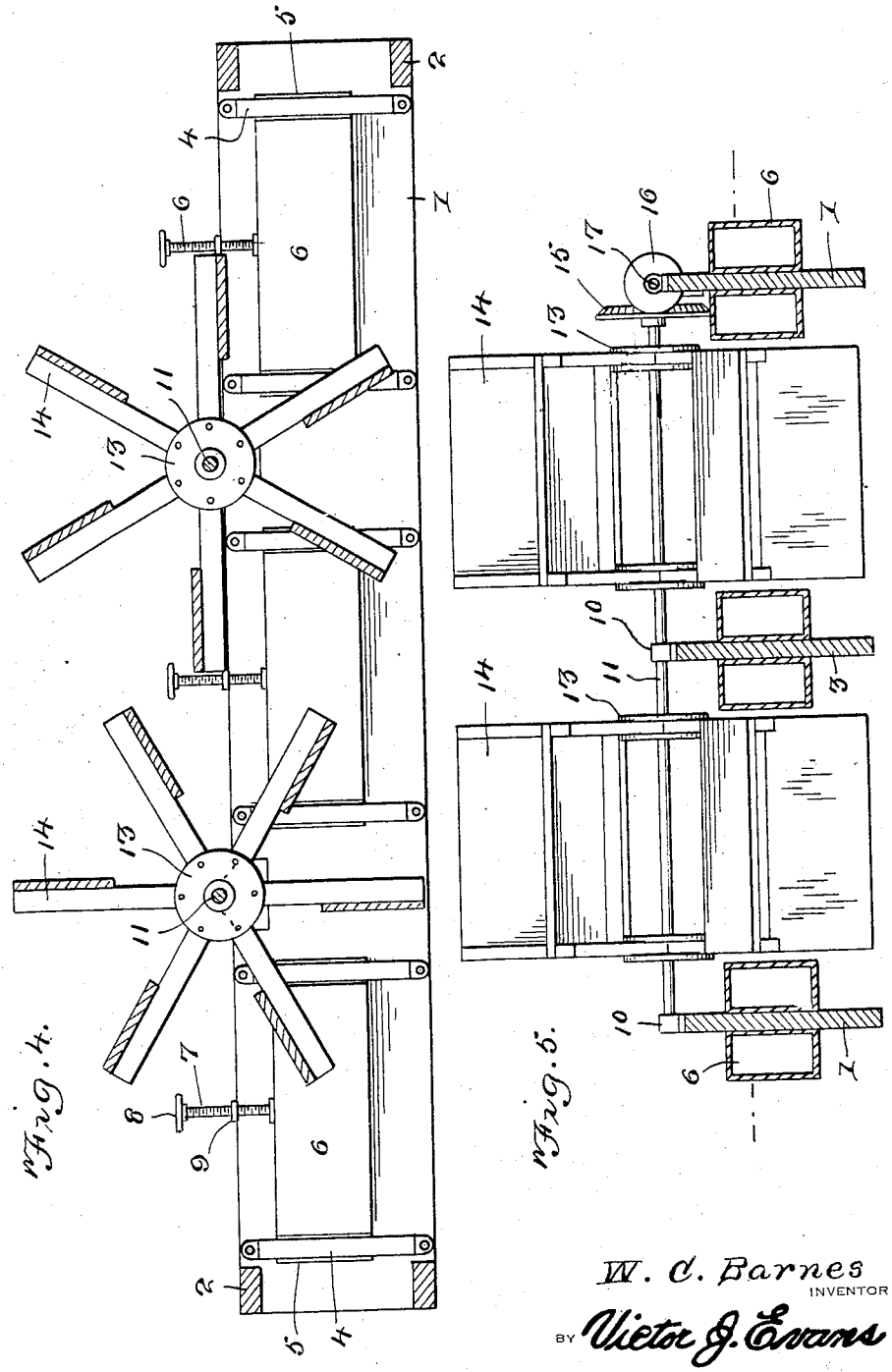

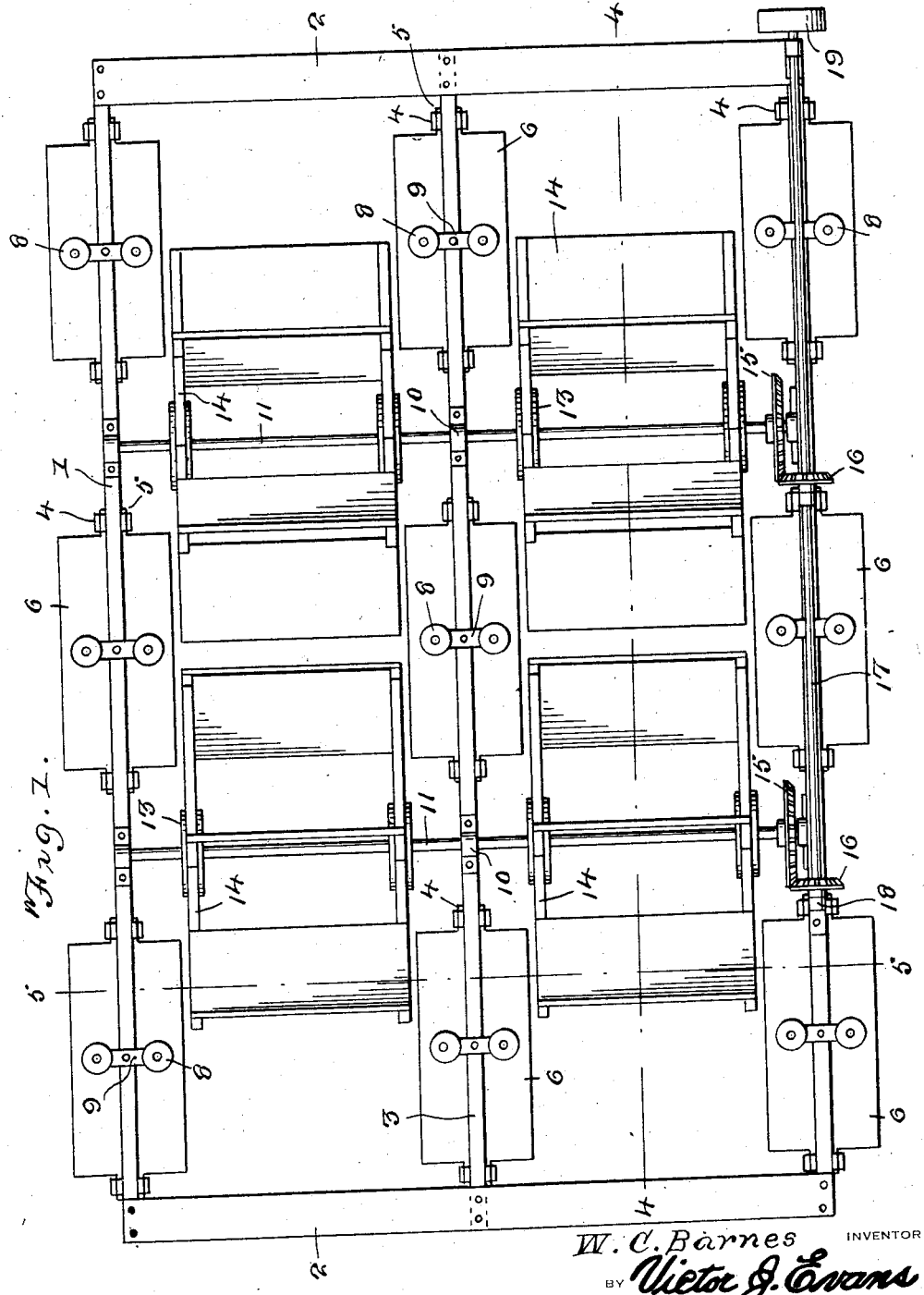

Patented May 22, 1928.

1,671,005

UNITED STATES PATENT OFFICE.

WILLIAM C. BARNES, OF GADSDEN, ALABAMA.

WATER WHEEL.

Application filed September 3, 1927. Serial No. 217,377.

My present invention has reference to a current motor designed to be anchored in a stream which causes the turning of water wheels that imparts rotation to a shaft that is hitched to mechanism to be driven.

An object is the provision of a current motor that includes a frame carrying water wheels and having vertically adjusted floats thereon whereby the blades of the water wheel may be regulated with respect to the current of the stream.

A still further object is the provision of a current motor that includes a substantially rectangular frame having a central longitudinal partition therein, and having water wheels journaled between the partition and the sides of the frame and which water wheels when turned impart motion to a power plant while on the sides of the frame and on the sides of the partition there are arranged for vertical adjustments floats, simple means being provided for adjusting the floats, means being also provided for limiting such adjustment, and the arrangement of the floats with respect to the frame being such that the said floats are protected by the frame.

To the attainment of the above broadly stated objects and many others which will present themselves as the nature of the invention is better understood, the improvement also resides in certain other novel features of construction, combination and operative association of parts, a satisfactory embodiment of which is disclosed by the accompanying drawings.

In the drawings:

Figure 1 is a top plan view of the improvement.

Figure 2 is a side elevation thereof.

Figure 3 is an end view thereof.

Figure 4 is a sectional view approximately on the line 4—4 of Figure 1.

Figure 5 is a sectional view approximately on the line 5—5 of Figure 1.

In the preferred embodiment of the improvement disclosed by the drawings I make use of a substantially rectangular frame. One end of the frame is designed to have attached thereto suitable cables whose ends have secured thereon suitable anchors whereby the frame may be anchored in a flowing stream. The side members of the frame are indicated for distinction by the numeral 1, the same being preferably in the nature of comparatively wide boards, and these side members are connected at their ends and at their upper and lower corners by transverse beams 2. The beams 2 also secure in the frame a central longitudinal board or partition 3.

Fixedly secured on the opposite faces of the sides 1 and the partition 3 there are offset ends of spaced pairs of straps 4, the said straps providing guides for the reduced ends 5 of floats 6. The floats are preferably in the nature of hermetically sealed metal boxes and each float, at the top and preferably at the center thereof, has swivelly associated therewith a screw 7 having an outer head 8 and passing through and engaging threaded openings in plates 9 that are fixedly secured to the top of the side members 1 and the central partition 3. By reference to the drawings it will be seen that the offset ends of the guide straps 4 provide a means for limiting the vertical adjustment of the floats in both directions and it will be apparent that the floats are held adjusted by the toothed engagement of the screws 7 with the threaded openings in the plates 9.

Journaled in suitable bearings 10, at points preferably equidistant from the ends of the frame there are transversely arranged shafts 11. These shafts pass through the hubs 13 of water wheels 14, each shaft carrying a pair of such water wheels and the wheels are disposed between the sides of the frame and the partition thereof. The shafts are, of course, keyed in the hubs of the water wheels. Each shaft, on one of its ends, has keyed thereon a beveled gear 15 that is in mesh with a pinion 16 that is fixed on a shaft 17 to be driven by the turning of the water wheels. The shaft 17 is arranged longitudinally over the top of one of the side members of the frame and is journaled in suitable bearings 18 secured to the said side members. The outer end of the shaft carries a pulley or similar power imparting wheel 9 designed to be hitched to suitable mechanism to be driven by the motor.

The water wheels are of the ordinary construction, the same having spokes radiating from the hub thereof and plates connected to the spokes. The arrangement of the floats with respect to the frame is such that the frame serves as a protector for such floats. Also the arrangement of the floats is such that should one of such floats become punctured or damaged the frame will still be supported at desired elevations with respect to the stream by the remaining floats and the damaged floats may be easily and quickly replaced.

The simplicity of the construction and the advantages thereof will, it is thought, be understood and appreciated without further detailed description, although it is to be understood that I do not wish to be restricted to the precise details herein set forth and therefore hold myself entitled to make such changes therefrom as fairly fall within the scope of what I claim.

Of course, more than one central partition may be employed and likewise water wheels may be arranged between the several partitions in a manner as above described.

Having described the invention, I claim:

1. A current motor designed to be anchored in a stream, comprising a substantially rectangular frame that includes comparatively wide side boards, a comparatively wide central board or partition, and upper and lower transverse beams connecting these boards, floats arranged at the opposite sides of the wheels, means for vertically adjusting the floats, water wheels, shafts for the water wheels journaled on the frame between the floats and a power imparting shaft journaled on the frame and rotated by the turning of the water wheels.

2. In a current motor, a substantially rectangular wooden frame, comprising comparatively wide side members, and a comparatively wide central member, upper and lower transverse beams connecting the ends of the sides and central beams, straps having offset ends which are secured to the faces of the central and side members of the frame, air-tight compartments providing floats having reduced ends received through the straps, means for vertically adjusting the floats with respect to the frame, and such adjustment being limited by the contact of the reduced ends of the floats with the offset ends of the straps, means holding the floats adjusted, water wheels having shafts journaled between the inner floats, and a power imparting shaft rotated by the turning of the water wheels.

3. A current motor comprising a substantially rectangular wooden frame that includes comparatively wide side members and comparatively wide central members and upper and lower transverse beams connecting said members, oppositely arranged straps having offset ends secured to the respective faces of the central and side members of the frame, water compartments providing floats having reduced portions received through the straps, headed screw members having their lower ends swivelly attached to the floats, plates secured to the frame and through which the screw members are threaded, spaced transverse shafts journaled in bearings on the top of the frame, water wheels keyed on said shafts and disposed between the inner floats on the frame, and a longitudinally extending shaft journaled on the frame, and intermeshing gears between this shaft and the shafts for the water wheels.

In testimony whereof I affix my signature.

WILLIAM C. BARNES.